United States Patent [19]

Southard

[11] 4,429,596
[45] Feb. 7, 1984

[54] ROTARY STEEL FILING APPARATUS FOR SHARPENING SAW CHAINS

[76] Inventor: Albert A. Southard, R.R. #3, Council Grove, Kans. 66846

[21] Appl. No.: 341,771

[22] Filed: Jan. 22, 1982

[51] Int. Cl.$^3$ .................. B23D 63/10; B23D 63/16
[52] U.S. Cl. .......................................... 76/36; 29/78; 76/25 A
[58] Field of Search ............ 76/25 A, 36, 31, 74; 29/78

[56] References Cited

U.S. PATENT DOCUMENTS

| | | | |
|---|---|---|---|
| 58,025 | 9/1866 | Nicholson | 29/78 |
| 570,579 | 11/1896 | Weed | 29/78 |
| 2,813,438 | 11/1957 | Paradis | 76/25 A |
| 2,818,752 | 1/1958 | Granberg | 76/25 A |
| 3,172,307 | 3/1965 | Kephart | 76/36 |
| 3,313,184 | 4/1967 | Granberg | 76/25 A |
| 3,744,349 | 7/1973 | Juncker | 76/25 A |
| 4,173,908 | 11/1979 | Aksamit | 76/36 |

FOREIGN PATENT DOCUMENTS

| | | | |
|---|---|---|---|
| 8534 | of 1911 | United Kingdom | 29/78 |
| 645783 | 2/1979 | U.S.S.R. | 29/78 |

Primary Examiner—Roscoe V. Parker
Attorney, Agent, or Firm—Robert E. Breidenthal

[57] ABSTRACT

An apparatus for use in combination with a specialized rotary steel file for enabling the sharpening of saw chains that includes an inverted channel-shaped body for accommodating a chain saw bar and saw chain therein. Adjustable chain centering elements serve to limit and predetermine the desired spatial relationship of the body and the bar which can be secured by clamping screws engageable with the bar. A recess in the body constitutes a window giving access to the saw chain, with guide grooves in the body at the bottom of the recess serving to position the rotary file during the sharpening procedure. A chain advancing unit is provided for properly advancing one tooth at a time to register properly a tooth to be filed with the grooves. A gauge is positionable in the recess to enable dressing gauge teeth of the saw chain to proper height is also provided. The preferred form of file is a rotary file of an overall cylindrical configuration conformable to the guide grooves; such file having a plurality of closely nested helical teeth inclined steeply to the file axis, and a loosely nested plurality of helical flutes of opposite inclination of less than about 15°.

15 Claims, 12 Drawing Figures

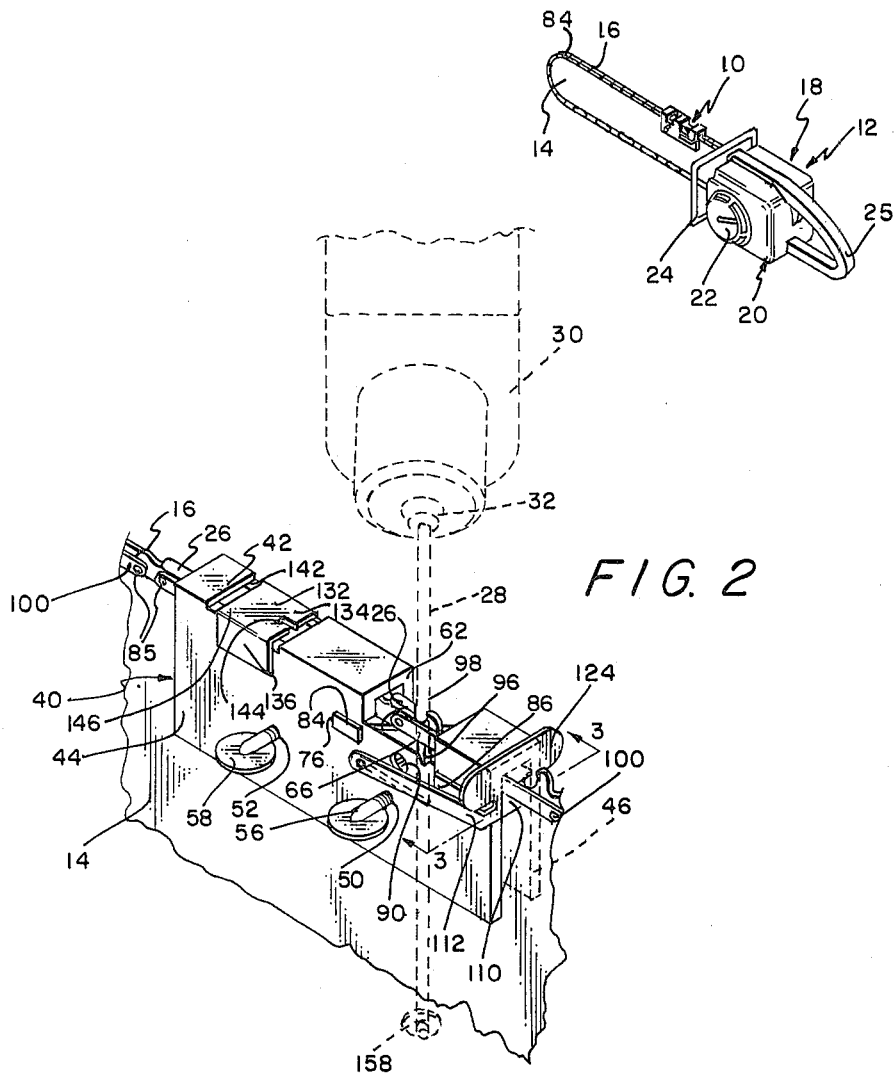
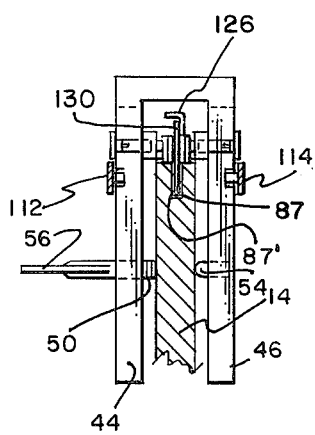
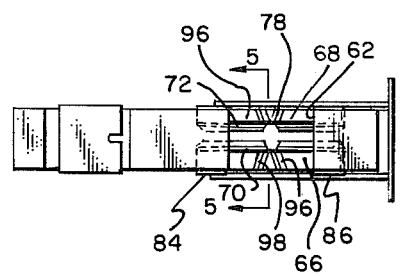

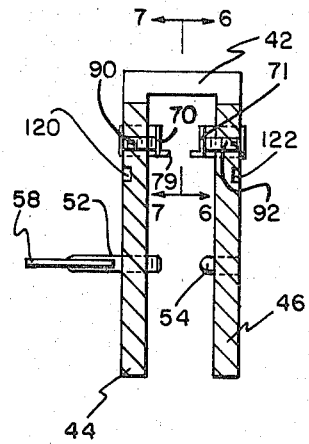
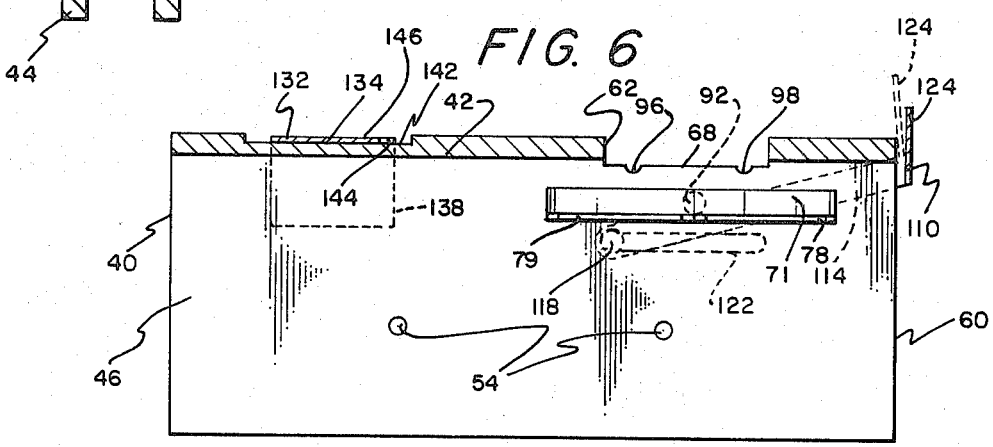
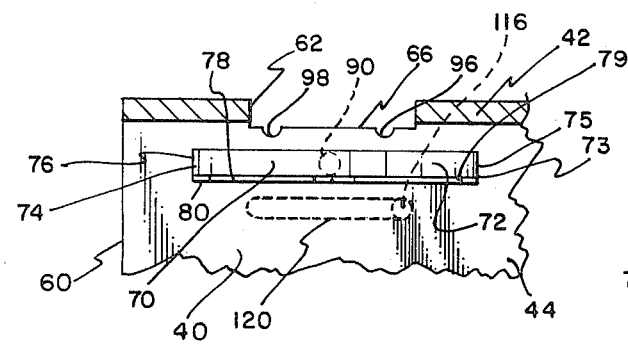
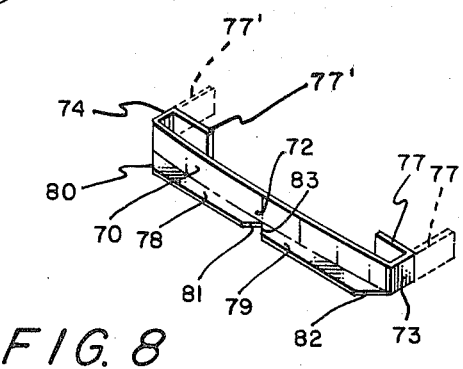

ROTARY STEEL FILING APPARATUS FOR SHARPENING SAW CHAINS

The present invention relates to new and useful improvements in apparatus for sharpening saw chains, and more particularly pertains to a template structure that can be detachably mounted on a chain saw bar to serve as a guide for a sharpening tool applied to the saw chain, and to an improved cylindrical file especially well suited for use with the template structure when rotatively driven by an electric hand drill or the like.

The paramount object of the instant invention is to provide a template structure that can be automatically indexed successively to the teeth of a saw chain, and to provide a rotary file that can be power driven in a guided fashion to effect a precision cut.

An important object is to provide a cylindrical file suitable for use with a template such as described in the preceding paragraph that has a cleaning flute appropriately inclined to a single cut multiplicity of spiraled cutting teeth.

Another object of the invention is to provide a template structure that will afford visual as well as physical guidance for either a manual or power driven tooth cutting tool.

An object in accordance with the preceding objects is to provide a saw chain advancing mechanism that is manually operable to advance the teeth of the saw chain in sequence, one at a time, so that the tooth next to be sharpened is advanced precisely to a position properly indexed or aligned with the cutting tool for sharpening.

Another object is to provide a template structure as given above with a gauge for facilitating proper dressing of the cutting depth gauge teeth, with the structure affording a storage accommodation for the gauge when not in use.

Still another object is to provide a precision gauge for proper adjustment of saw chain tension on the saw bar.

One aspect of the invention involves apparatus for sharpening a saw chain comprising a channel-shaped body that includes an elongated horizontally extending web having laterally spaced depending flanges adapted to receive therebetween an upper horizontal portion of a chain saw bar having a saw chain entrained thereabout, penetration limiting means carried by the body and adapted to engage a chain saw bar to limit upward movement of the latter whereby clearance between a saw chain and the web is assured, means carried by the body for releasably holding a chain saw bar disposed between the flanges against relative movement, said body having a window recess in the top thereof affording a view of space between the flanges from above, with said recess being bounded as to its lowermost extent by horizontal coplanar surfaces of the flanges spaced vertically below the vertical extent of the web, and saw chain engaging means disposed in the space between the flanges adjacent the lowermost extent of the window recess for limiting lateral movement of a saw chain between the flanges, and said surfaces being provided with means facilitating guidance of a sharpening tool in the sharpening of a saw chain tooth.

Another aspect of the invention involves an elongated rotary file of generally circular cylindrical configuration having a plurality of axially closely spaced single-cut helically shaped cutting serrations that are inclined to the directrix of the cylindrical configuration about 35° to about 45°, and said file also being provided with a plurality of axially widely spaced flutes of helical configuration that are inclined to the directrix less than about 15° and in a direction opposite to that of the serrations.

The invention will be most readily appreciated in the light of the following description of a preferred embodiment of the same which is given in conjunction with the accompanying drawings, wherein:

FIG. 1 is an isometric view on a diminutive scale of the template structure showing the same in its position of use straddling the saw chain and mounted on the chain saw bar.

FIG. 2 is an isometric view of the template structure showing the same mounted on a fragmentary depiction of the bar and saw chain. The relative position of the rotary file and a portion of an electric hand drill driving the same are shown in dashed outline;

FIG. 3 is a sectional view on a reduced scale of the template structure shown in FIG. 2, the view being taken upon the plane of the section line 3—3 in FIG. 2;

FIG. 4 is a top plan view of the template structure, with the finger clamping screws omitted;

FIG. 5 is a vertical sectional view taken on the plane of the section line 5—5 in FIG. 4;

FIG. 6 is a vertical sectional view taken in the plane of the section line 6—6 in FIG. 5, with hidden details being shown by dashed lines;

FIG. 7 is a fragmentary sectional view taken upon the plane of the section line 7—7 in FIG. 5, with hidden details being shown in dashed lines;

FIG. 8 is an isometric view of one of the combined holding and stop elements, with end portions thereof being shown in dashed outline in their configurations prior to being bent to their full line configurations during final assembly;

Figure 10:
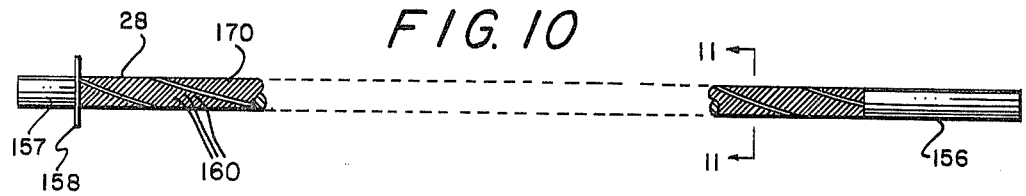
FIG. 10 is a side elevational view of a cylindrical rotary file.

Referring now to the drawings wherein like numerals designate like parts throughout the various views, the reference numeral 10 designates the template structure generally. The template structure 10 is adapted to be detachably mounted on a conventional power chain saw 12 that includes a bar or blade 14 about which a saw chain 16 is movably and guidingly entrained. The chain saw 12 includes an operating unit 18 that conventionally includes a prime mover 20 (which may, of course, be electric or gasolene powered), starting mechanism 22 and handles 24 and 25.

The template structure 10 is oriented relative to the bar 14 and the chain 16 for sharpening the cutting teeth 26 of the latter by an unconventional rotary cylindrical file 28 that is driven by a conventional hand held electric hand drill partially shown in dashed outline in FIG. 2 at 30 with the file 28 extending from the chuck 32 of the latter.

Proceeding now with a detailed description of the template structure 10, the same comprises a unitary, channel-shaped body 40 that includes a web 42 that connects parallelly spaced, depending flanges 44 and 46. The body 40 is preferably metallic (aluminum, steel, die-cast zinc, etc.); however, it will be recognized by those skilled in the art that various synthetic resins and polymers can, with a considerable degree of success, be substituted for the use of metal in the body 40 as well as for some of the other components of the template structure 10. Needless to say, the template structure 10 can be of hybrid nature, that is, some components of metal with others being nonmetallic.

The spacing of the flanges 44 and 46 is somewhat greater than the width of the bar 14 and the chain 16 so that the body 40 can be placed on the bar 14 (at a position intermediate the extent of the bar 14 as shown in FIG. 1) with the flanges 44 and 46 straddling the bar 14 and the upper flight of the chain 16, with the web 42 being positioned, by means presently to be described, parallel to the upper flight of the chain 16 and in a predetermined spaced relation to the chain 16.

When the body 40 is positioned as stated above, the same is releasably held fixed in its spatial relationship to the bar 14 by means of a pair of spaced clamping screws 50 and 52 which are adjustably threaded through the flange 44 to engage the bar 14 and force the same against opposed proturberances 54 on the flange 46. The protuberances 54 may be conveniently constituted of short screws threaded with a snug friction fit through the flange 46 to protrude from the latter interiorly, but not outwardly. The screws have kerfs, not shown, by means of which the extent of the internal protrusion can be initially set or subsequently readjusted on applying sufficient torque to overcome the considerable friction of the snug threaded fits. The extent of the protrusions 54 into the space between the flanges 44 and 46 is such that the bar 14 can be moved between the protrusions 54 and the screws 50 and 52 when the latter are retracted, and such that the bar 14 is clamped in a central position such as shown in FIG. 3 when the screws 50 and 52 are tightened by use of the finger grip heads 56 and 58 thereof.

The body 40 is provided adjacent one end 60 thereof with a recess 62 that affords a window in the top thereof that opens downwardly into the space between the flanges 44 and 46. The recess 62 has a depth greater than the thickness of the web 42 and the lowermost extent thereof is defined by coplanar horizontal upper surfaces 66 and 68 of the flanges 44 and 46 that are parallel to and spaced below the web 42 of the body 40.

Means are provided for the dual purposes of (1) selectively setting the vertical spacing of the bar 14 from the web 42 and setting the spacing of the chain 16 from the web 42, and (2) for releasably centering and restraining the saw chain 16 against any significant lateral movement in the vicinity of the recess 62. Such means comprises a pair of elongated elements or straps 70 and 71 respectively carried by the flanges 44 and 46. As the straps and the mountings thereof are mirror images, a detailed description of the strap 70 and its mounting will suffice for both. The strap 70 comprises an elongated and horizontally extending body 72 of rectangular transverse section disposed between the flanges 44 and 46 and having right-angled end portions 73 and 74 extending through short vertical slots 75 and 76 through the flange 44. The strap 70 is retained in assembled relation after the portions 73 and 74 have been extended through the slots 75 and 76 by the end portions 73 and 74 being bent to form the tab portions 77 and 77' thereof against the outer face of the flange 44. FIG. 8 shows in dashed outline the ends 77 and 77' before they are bent to their full line positions during assembly.

The extent of the strap or body 71 intermediate the portions 73 and 74 has a pair of longitudinally spaced integral right-angled flanges 78 and 79. The remote ends of the flange 78 have beveled ends 80 and 81, and the remote ends of the flange 79 have beveled ends 82 and 83. The flanges 78 and 79 are spaced as shown in FIG. 8 so that the body 72 can be resiliently flexed through the extent of such spacing.

Figure 12:
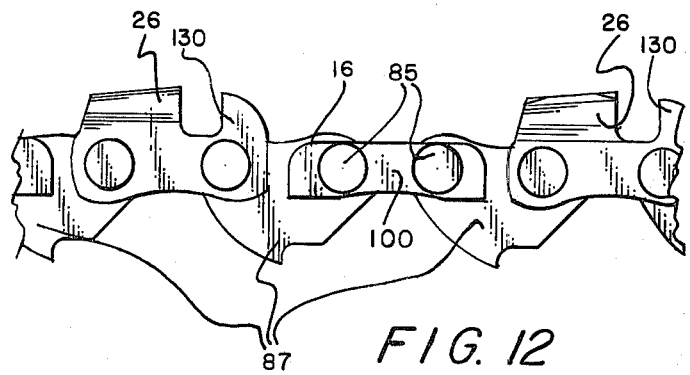

In repose the body 72 is convex toward the strap or element 71. The spacing between the straps 70 and 71 coupled with the bevels 80 on the flanges 78 enables the device 10 to be passed over the nose end 84 of the chain saw 12 so that the flanges 78 and 79 of the straps 70 and 71 are disposed under the rivets or pivot pins 85 and the links 100 of the chain 16 (see FIGS. 2 and 12) so as to be vertically interposed between and to space the under edges of the links 100 from the upper edge of the bar 14. Engagement of the flanges with the chain 16 below the links 100 limits the extent that the device 10 can be pressed downwardly upon the bar 14. In use the device 10 is pressed down to such limited extent which assures parallelism between the chain 16 and the web 42 so that the teeth of the former are spaced from the latter. With the device 10 so positioned, the clamping screws 50 and 52 are tightened to fix the device 10 to the bar 14, whereupon adjustment of holding screws 90 and 92, which are threaded through the flanges 44 and 46 in alignment with midpoint positions of the straps 70 and 71, are turned to cause them to bear against and thereby resiliently flex the flanges of the straps 70 and 71 against the portions of the chain 16 immediately below the links 100, such adjustment being easily effected by a screwdriver, not shown, as the screws 90 and 92 are provided with kerfs for such purpose. The adjustment is loose and the screws 90 and 92 can be backed off slightly to allow endwise movement of the chain 16. It will be noted that such adjustment substantially prevents lateral movement of the saw chain 16 in the vicnity of the recess 62 and assures proper centering of the saw chain 16 between the flanges 44 and 46. Adjustment flexing of the straps 70 and 71 accentuates the convex curvature of such elements toward each other with the result that any given part of the chain 16 is smoothly guided to its centered position as it approaches the recess 62 on lengthwise movement of the chain 16. The vertical extent of the straps 70 and 71 are such that the teeth are at a height suited to the sharpening of the teeth yet to be described.

Before proceeding to describe the sharpening operation, it is to be noted that the interpositioning of the flanges 78 and 79 between the links 100 and the bar 14 is such that the saw chain 16 can be ideally tensioned upon use of the conventional means, not shown, for increasing the extension of the bar 14 from the prime mover 20. With the bar 14 extended as may be freely effected by the use of the conventional adjustment means, it will be found on subsequent disengagement of the device 10 that proper tension and clearance of the chain 16 is realized.

The upper sides 66 and 68 of the flanges 44 and 46 at the bottom of the recess 62 are provided with guide grooves 96 and 98 that are aligned so that projections thereof intersect midway between the flanges 44 and 46. The grooves 96 and 98 are inclined to the extent of the template at the precise angle for the size of the saw chain as established by the manufacturer's specifications. The grooves 96 and 98 can serve as visual angle guides for the use of any conventional tooth sharpening tool in the sharpening of any tooth 26 appropriately advanced along the bar guided path of the chain 16. The grooves 96 and 98 are conformable to a cylindrical surface of the diameter of the file 28 so that such grooves 96 and 98 not only serve to aid visual placement of the file 28, but actually can physically accommodate the file 28 in the sharpening of a tooth 26. It will be evident that the grooves 96 and 98 are alternately used for alternate teeth 26 of the chain 16 as alternate teeth are sharpened at opposite though equal angles of inclination. Details of the file 28 will be set forth subsequently.

Means are provided to assure proper endwise positioning of the saw chain 16 to sharpen a tooth 26 thereof in relation to the guide grooves 96 and 98. Such means comprises a U-shaped chain advancing member that includes a chain engaging web portion 110 that connects a pair of legs 112 and 114 that straddle the body 40 with the legs having opposed studs or trunnions 116 and 118 that are slidingly and rotatably received in elongated slots or grooves 120 and 122 in the outer sides of the flanges 44 and 46. The chain engaging portion or web 110 is integral with an upstanding and laterally extending finger gripping structure, whereby the chain engaging portion 110 and the finger gripping structure 124 can be raised from a chain engaging position such as shown in full lines in FIG. 6 to an elevated chain clearing position shown in dashed outline in the same figure. The length of the slots or grooves 120 and 122 are such that the chain engaging porton 110 can be raised and while elevated moved to the left as viewed in FIG. 6 as far as allowed by the slots 120 and 122, and then lowered to engage the chain 16 to the left of a gauge tooth 130 such as the one shown in FIG. 2. With the tooth engaging portion 110 then moved to the right as viewed in FIG. 9, the chain 16 will be advanced the spacing of adjacent cutting teeth 26 so that the tooth 26 next to be sharpened is precisely positioned in registry with or indexed relative to the guide grooves 96 and 98. The file 28 is then used to sharpen such tooth using whichever of the grooves 96 and 98 is appropriate to the tooth involved.

In order to assure that the teeth 26 are cutting at an optimum depth of cut, it is occasionally prudent to dress or file down slightly the height of the gauge teeth 130. It is proper to undertake such dressing after all the cutting teeth have been sharpened.

Figure 9:
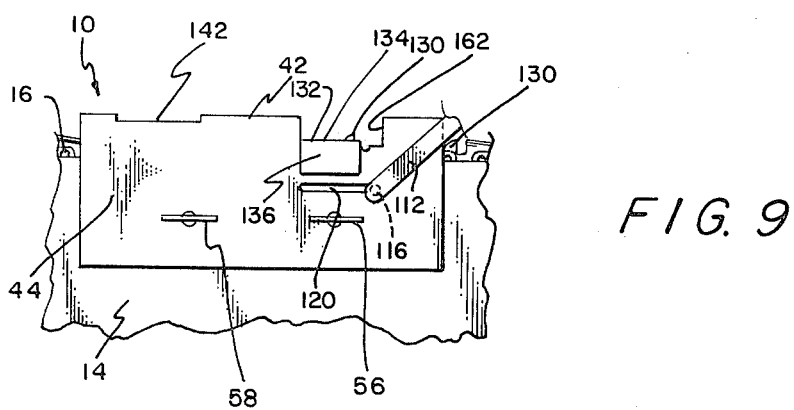
FIG. 9 is a side elevational view of the template mounted on a fragmentarily illustrated bar and saw chain, and illustrates the gauge in its position of use as well as the extended portion of the partially shown chain advancer.

So that the gauge teeth 130 can be dressed to a precise height differential with respect to the cutting teeth 26, a U-shaped gauge 132 is provided that includes a web 134 that connects depending legs 136 and 138 that are resilient and biased to frictionally grip the flanges 44 and 46 when straddling the latter in either its position of use shown in FIG. 9 and in its storage position shown in FIGS. 2 and 6. It will be noted that the web 42 is cut away or of reduced height at 142 to accommodate the gauge 132 in its storage position and to shelter the same somewhat from accidental dislodgment.

The device 10 is removed from the bar 14 and chain 16 by reversing the order of the steps previously given for its attachment. The device 10 is then reattached by passing it over the nose end 84 of the saw 12 as previously outlined except that the flanges 78 and 79 are disposed at a height such as to abut the opposed side surfaces of the bar 14 in spaced parallelism to its upper edges. The spacing is such that the teeth 26 are in very closely spaced proximity to the underside of the web 42 so that there is free running clearance for movement of the chain 16. With the device 10 pressed down upon the bar 14 and chain 16 to its parallel limiting position, the clamping and adjustment screws are tightened as previously described. The chain 16 now positioned for dressing of the gauge teeth 130, and the depending guide ribs 87 of the chain 16 (that travel conventionally in a peripheral groove 87' in the bar 14) is slidingly engaged between the flanges of the straps 70 and 71.

With the template or device 10 attached to the bar 14 and 16 as last described, the gauge 132 is placed in the recess 62 and the web 134 is seated against the surfaces 66 and 68 with the gauge 132 and the chain 16 being oriented so that a gauge tooth 130 is received in a central notch 144 at one end of the web 134 of the gauge. The thickness of the web 134 is such that the upper end of a gauge tooth 130 will coincide with the top surface 146 of the gauge web 134 if the tooth 130 is of the proper height. If the tooth 130 projects above the gauge 132, as is the case in FIG. 9, a flat file, not shown, can be applied readily to dress or file the same down the necessary extent. With only a modicum of skill, such dressing can be effected without appreciable wear or removal of material of the gauge 132.

Attention is now directed to FIG. 10 for an appreciation of the structure of the special rotary file 28. The file 28 has an overall right circular cylindrical configuration with opposite end portions 156 and 157 thereof being substantially smooth or free of teeth so as to be readily received in and releasably gripped by the chuck of conventional electric hand drills in the same manner as twist drills. The end portions 156 and 157 can both be cylindrical and of slightly less diameter than the intermediate extent of the file 28.

In the preferred construction, the end portion 157, rather than being suitable for receipt in a chuck, has fixed thereto a circular enlargement 158 that constitutes a stop engageable with the body 40 so as to prevent accidental withdrawal of the file 28 from cutting engagement with a tooth 26. This allows the user to better direct his attention to the actual cutting and still make use of the entire extent of the file 28 without being distracted by concern he might accidentally withdraw the file endwise.

Intermediate the end portions 156 and 157, the file 28 is provided about its periphery with a multiplicity of nested serrations or teeth 160, each of which would be of continuous helical or spiral configuration except for flutes or grooves 172 to be subsequently described. The helical character of each tooth 160 is such as to be steeply inclined to a generating directrix of the overall cylindrical configuration and can be so inclined from about 35° to about 55° with about 45° being preferred. The nested single-cut heliform teeth 160 collectively present about 60 to about 80 teeth per inch along the generating directrix. The teeth 160 preferably have a height of approximately 45 to 50 percent of the spacing of adjacent convolutions of the teeth along the generating directrix.

In longitudinal section the teeth 160 are preferably inclined in their radial extent or height toward the left end portion as the file 28 as shown in FIG. 10 so as to effect a markedly greater cutting action when the file 28 is moved to the left as viewed in FIG. 10.

Figure 11:
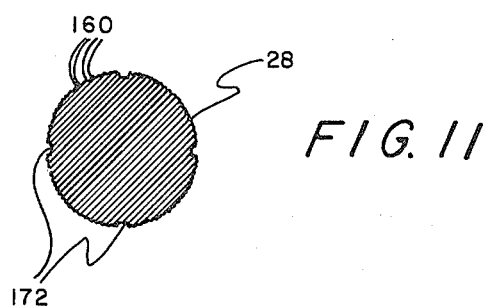
FIG. 11 is an enlarged transverse sectional view of the rotary file taken upon the plane of the section line 11—11 in FIG. 10; and, FIG. 12 is an enlarged fragmentary side elevational view of a saw chain.

The toothed extent 170 of the file 28 intermediate the end portions 156 and 157 is provided with a plurality of uniformly nested flutes or grooves 172 (four being shown) of helical configuration that are inclined or turn in a direction to the rows of teeth 160. As quite plain in FIG. 11, the flutes 172 are of much greater size ad depth than the teeth 160 and in addition are much less steeply inclined to the directrix, preferably less than about 15°. The flutes 172 serve to clean the filling teeth 160 of cuttings as the filing or sharpening proceeds. Also the flutes 172 enable the file 28 to be operated efficiently at a higher rate of rotation than would otherwise be the case. In addition, the flutes 172 assist in distributing cutting oil and in cooling the teeth 160.

Optionally, the file 28 is provided, as shown in FIG. 10, with a stop or radial enlargement 158 having a configuration of a surface of revolution. The function of the stop 158 is to enable the user to make full use of the length of cutting portion of the file. For example, when the end portion 156 is disposed in the chuck 32 of an electric hand drill 30, the user can draw the latter toward himself without fear of or having to divert his attention and use care to avoid withdrawing the file from engagement with the saw chain 16 as the stop 158 engages a flange 44 or 46, as the case may be, to prevent endwise withdrawal of the file 28.

The file 28 can be readily manufactured of conventional materials using techniques well known in the rotary file and twist drill manufacturing arts inclusive of the steps to impart substantial hardness to the teeth 160.

As the invention has been sufficiently described to enable others to make and properly use the same, attention is now directed to the appended claims.

I claim:

1. Apparatus for sharpening a saw chain comprising a channel-shaped body that includes an elongated horizontally extending web having laterally spaced depending flanges adapted to receive therebetween an upper horizontal portion of a chain saw bar having a saw chain entrained thereabout, penetration limiting means carried by the body and adapted to engage a chain saw bar to limit upward movement of the latter whereby clearance between a saw chain and the web is assured, means carried by the body for releasably holding a chain saw bar disposed between the flanges against relative movement, said body having a window recess in the top thereof affording a view of space between the flanges from above, with said recess being bounded as to its lowermost extent by horizontal coplanar surfaces of the flanges spaced vertically below the vertical extent of the web, and saw chain engaging means disposed in the space between the flanges adjacent the lowermost extent of the window recess for limiting lateral movement of a saw chain between the flanges, and said surfaces being provided with means facilitating guidance of a sharpening tool in the sharpening of a saw chain tooth.

2. The combination of claim 1, together with means carried by the body for effecting a predetermined saw chain displacement in the direction of the horizontal extent of the web, said chain displacement means including a chain engaging portion, said chain displacement means being mounted on the body by means enabling a first movement of said chain engaging portion in a direction substantially normal to the direction of the horizontal extent of the web, and a second movement of predetermined extent in the direction of the extent of the web when the chain engaging portion is substantially aligned with the extent of the web.

3. The combination of claim 1, together with gauge means for enabling dressing a gauge tooth of a saw chain to a predetermined height differential below a cutting tooth thereof, said gauge means comprising an inverted U-shaped member comprising a gauge web connecting depending legs, said gauge being receivable in the recess with the legs straddling the body flanges with the gauge web seated against the horizontal surfaces of the flanges, whereby the gauge web has an upper surface defining the height to which a gauge tooth of a saw chain should be dressed.

4. The combination of claim 3, wherein the legs of the gauge means are resilient and spaced to resiliently grip the flanges of the body therebetween, and wherein the top of the web of the body is indented at a position spaced from said recess to establish a storage position for the gauge means such that the legs of the latter grip the flanges therebetween when the gauge web is disposed in the indentation.

5. The combination of claim 3, wherein the gauge web is provided with an opening therethrough that is adapted to receive a gauge tooth of a saw chain upwardly therethrough, whereby a gauge tooth can be dressed to a height corresponding to the height of the top of the gauge web.

6. The combination of claim 1, wherein the chain engaging means comprises a pair of elongated and spaced arcuate elements carried by the flanges in opposed relation to each other, said elements extending horizontally in the direction of the extent of the web of the body, said arcuate elements having convex surfaces that face each other, said elements being resilient with means securing the remote extremities of the elements to the body to enable flexure of intermediate extents of the elements toward and away from each other.

7. The combination of claim 6, wherein the elements have horizontally coplanar lower edges constituting the penetration limiting means.

8. The combination of claim 6, together with adjusting means movably carried by the body and engageable with the elements for adjustably flexing the latter toward each other against thin reslience, whereby the elements can limit lateral movement of a saw chain therebetween.

9. The combination of claim 8, wherein the adjusting means comprises means threaded in the body.

10. The combination of claim 1, wherein the chain engaging means includes a pair of elongated and spaced elements carried by the flanges in opposed relation to each other, each of said elements extending horizontally in the direction of the extent of the web of the body, each of said elements including a pair of longitudinally spaced flanges along its lower edge that extend horizontally toward the corresponding flanges of the other element, each of said elements being of resilient material and bent intermediate its flanges to be convex toward the other element, with said adjacent and horizontally extending edges of the flanges being adapted to be engageable with opposite sides of a saw chain disposed between the elements.

11. The combination of claim 2, wherein the chain engaging portion is provided with a pair of spaced arms disposed on opposite sides of the body, said body being provided on opposite sides thereof with a pair of elongated slots, and said arms being provided with a pair of opposed trunnions that are rotatably and longitudinally slidably received in the slots to enable said movements of the chain engaging portion.

12. The combination of claim 1, wherein the last recited means comprises said upper surfaces being provided with a pair of oppositely inclined grooves of a size adapted to accommodate a file.

13. The combination of claim 12, in combination with a rotary steel file, said file being of generally circular cylindrical shape and having an axial filing extent of at least twice as great as the lateral width of said body, said file having throughout its filing extent a plurality of axially closed spaced, helically shaped cutting serrations that are inclined to the directrix of the cylindrical configuration about 35° to about 45°, and said file also being provided with a plurality of axially widely spaced flutes of helical configuration that are inclined to the directrix less than about 15° and in a direction opposite to that of the serrations, and said file having a precise diameter conformable to the grooves, as well as being adapted to conform to the cutting edges of a saw chain cutting tooth.

14. The combination of claim 13, wherein one end of the file is adapted for engagement in a power drill chuck, and the other end is provided with a radially enlarged knob portion having a surface that is a surface of revolution about the axis of the file.

15. The combination of claim 13, wherein said file is adapted adjacent one end thereof to be coupled to a rotary drive, and wherein said file is radially enlarged adjacent its other end, with such radial enlargement having a diameter that is at least as great as its axial extent.

* * * * *